(12) United States Patent
Sundberg et al.

(10) Patent No.: US 7,347,037 B2
(45) Date of Patent: Mar. 25, 2008

(54) TRANSPORT METHOD AND APPARATUS FOR MOWER DECK

(75) Inventors: John David Sundberg, Augusta, GA (US); Christopher Scott Thorman, Beaver Dam, WI (US); Robert Neil Fox, Appling, GA (US); Harlin James Trefz, Jackson, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/242,974

(22) Filed: Oct. 4, 2005

(65) Prior Publication Data

US 2007/0074496 A1 Apr. 5, 2007

(51) Int. Cl.
*A01D 34/00* (2006.01)
(52) U.S. Cl. ...................................... 56/14.9
(58) Field of Classification Search .................. 56/14.9, 56/15.6, 15.7, 15.8, 15.9, 504; 172/451, 172/439, 450, 248, 298; 280/416.2, 481
See application file for complete search history.

(56) References Cited

U.S. PATENT DOCUMENTS

| 4,195,860 | A | * | 4/1980 | Helams | 172/451 |
| 4,310,997 | A | * | 1/1982 | Streicher | 56/15.9 |
| 4,313,295 | A | * | 2/1982 | Hansen et al. | 56/15.8 |
| 4,325,211 | A | * | 4/1982 | Witt et al. | 56/15.8 |
| 4,715,168 | A | * | 12/1987 | Oxley | 56/15.8 |
| 4,840,020 | A | * | 6/1989 | Oka | 56/15.2 |
| 4,916,889 | A | * | 4/1990 | Molstad | 56/14.9 |
| 4,930,801 | A | * | 6/1990 | Gillund | 280/481 |
| 5,355,665 | A | * | 10/1994 | Peter | 56/15.8 |
| 6,481,194 | B1 | * | 11/2002 | Brewer et al. | 56/17.2 |
| 6,588,188 | B2 | * | 7/2003 | Dennis | 56/16.3 |
| 6,796,384 | B1 | * | 9/2004 | Potter | 172/439 |

* cited by examiner

*Primary Examiner*—Árpád Fábián Kovács

(57) ABSTRACT

Transport brackets are welded onto the top surface of the mower deck, each transport bracket having vertical plates with holes extending transversely through the plates. Pins extend through at least one hole in the plates and are secured to a rear mounted hitch of a tractor. The mower deck may be lifted and transported in a raised position behind the tractor, and also may be pivoted to a position for servicing.

9 Claims, 4 Drawing Sheets

TRANSPORT METHOD AND APPARATUS FOR MOWER DECK

FIELD OF THE INVENTION

This invention relates generally to mower decks carried by tractors and utility vehicles for agricultural work and lawn care, and particularly to transporting a mower deck while the deck is not in use.

BACKGROUND OF THE INVENTION

Tractors and utility vehicles used for agricultural work and lawn care may carry a mower deck covering two or more rotary cutting blades on the lower ends of vertically oriented spindles. While in use, the mower deck may be attached to a tractor or other vehicle with mechanical linkages that allow the deck to operate at a range of different cutting heights, and raised or lowered between each height. The blade spindles may be rotated by one or more belts and pulleys above the top surface of the deck, which may be driven by an engine and/or power take off shaft. The deck perimeter may have several anti-scalp wheels and/or caster wheels, also referred to as gauge wheels.

Mid-mounted mower decks may be attached to and/or suspended from the frame of a tractor or utility vehicle at a position between the front and rear wheels. Often it may be desirable to remove the mower deck in order to service the unit or store it while using other implements. A mower deck may be cumbersome to lift and move after it is disconnected from its mounting position under the tractor or vehicle. Additionally, a mower deck may weigh several hundred pounds and may be difficult to carry and handle. As a result, a hoist or some other lifting attachment may be required to lift and manuever a mower deck into a desired position.

A mower deck is needed that can be lifted and transported without a hoist or another lifting attachment. A transport system is needed to lift and carry a mower deck with a three point hitch or other rear hitch. A mower deck transport method is needed to quickly and easily lift and carry a mower deck.

SUMMARY OF THE INVENTION

A method and apparatus for lifting and transporting a mower deck in a generally horizontal position is provided. A pair of transport brackets may be mounted on the top surface of the mower deck, the transport brackets configured to mate with a three point hitch or other rear-mounted hitch on a tractor. The transport brackets allow the mower deck to be lifted and pivoted so that the underside of the mower deck may be accessed and serviced. The apparatus may include removable pins that may be removed or disengaged from the transport brackets so that the deck may swing to a generally vertical position for servicing.

DESCRIPTION OF THE PREFERRED EMBODIMENT

Figure 1:
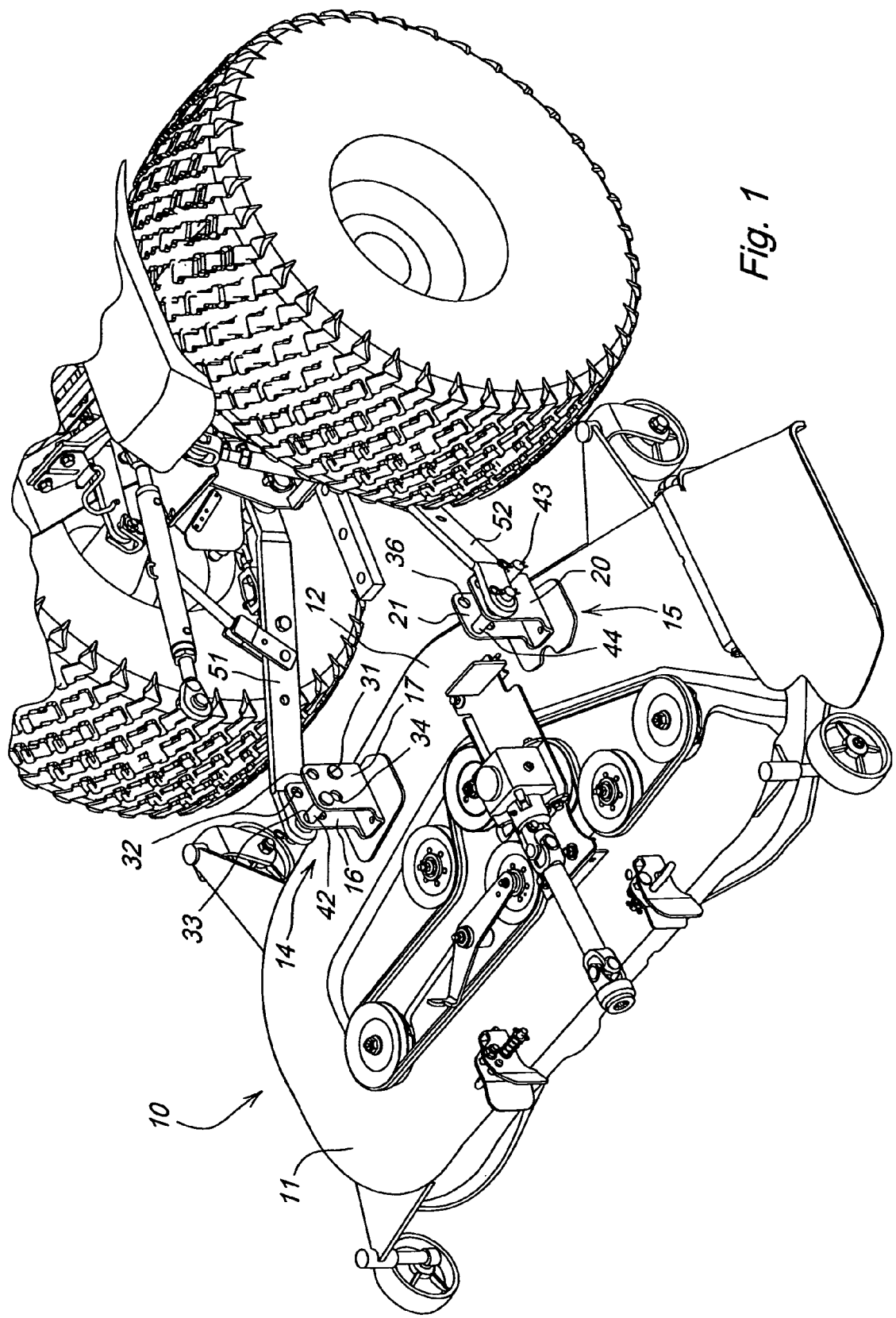
FIG. 1 is a rear perspective view of a mower deck with transport brackets connected to a rear-mounted three point hitch according to a first embodiment of the invention.

In one embodiment, as shown in FIG. 1, mower deck 10 may cover a plurality of rotary cutting blades mounted on the lower ends of vertically oriented spindles. The mower deck may have a top surface 11, a front facing edge 12 with a rim extending downwardly from the top surface, left and right sides and a back edge. During mowing, the mower deck may be mid-mounted under a tractor or vehicle frame between the tractor or other vehicle's front and rear wheels.

Figure 2:
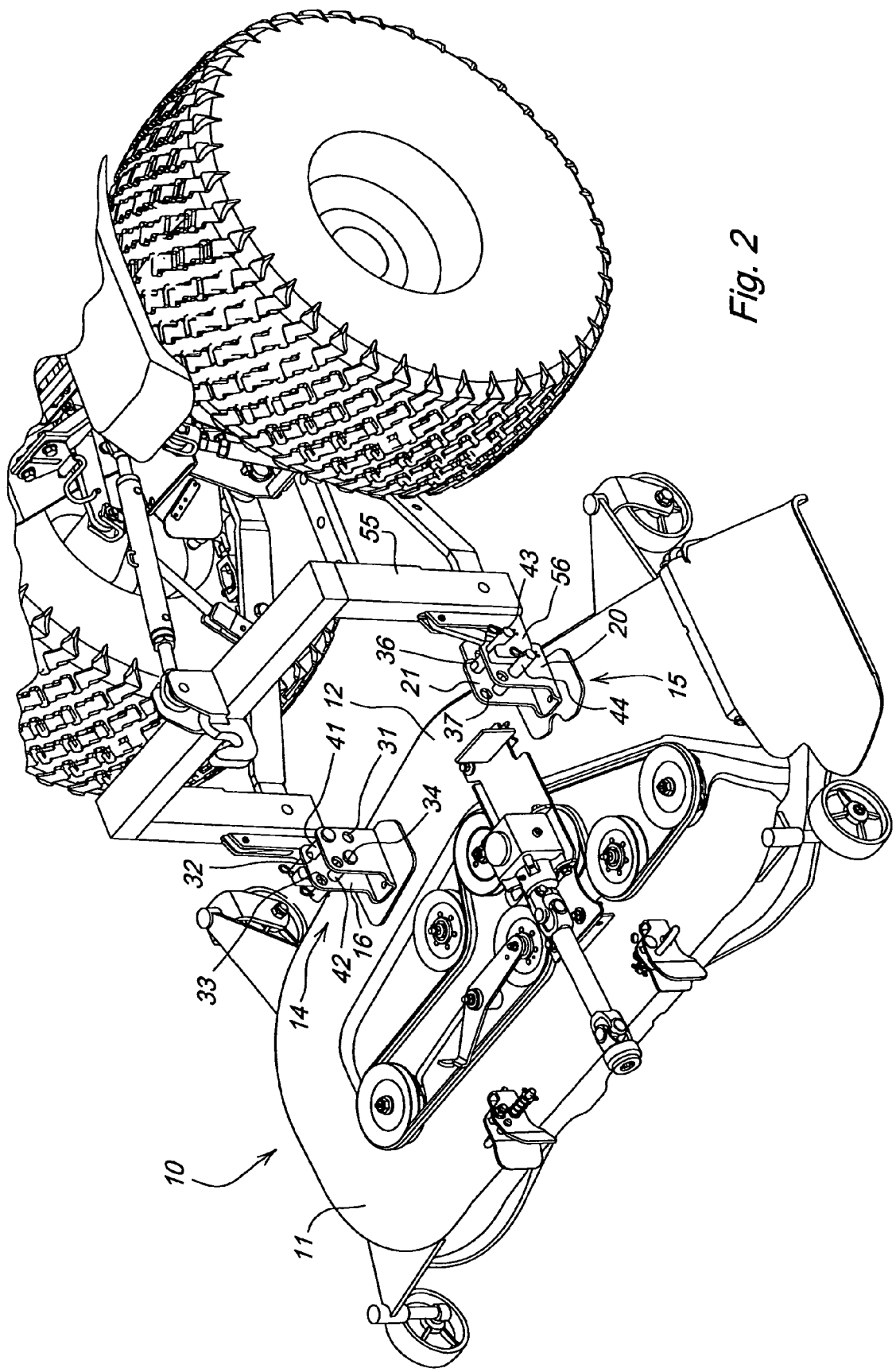
FIG. 2 is a rear perspective view of a mower deck with transport brackets connected to a rear-mounted quick attach coupler according to a first embodiment of the invention.

In one embodiment, left and right transport brackets 14, 15 may be mounted on the top surface of the mower deck. The left and right transport brackets may be welded or attached by mechanical means to the top surface of the deck, near either the front rim or rear rim of the deck. In the embodiment of FIGS. 1 and 2, the transport brackets are adjacent the mower deck's front rim. The spacing between the left transport bracket and the right transport bracket may correspond to the standard width of a three point hitch or a similar rear mounted quick attach coupler conventionally mounted to the rear of a tractor that may be used to raise and lower attachments using hydraulic power.

In one embodiment, left transport bracket 14 may include a pair of vertical plates 16, 17 fastened by welds or other secure mechanical attachment means to the top surface of the mower deck. Plates 16, 17 may be separated from each other by between about one inch and about five inches, and the brackets together may form a one-piece U-shaped member.

Figure 3:
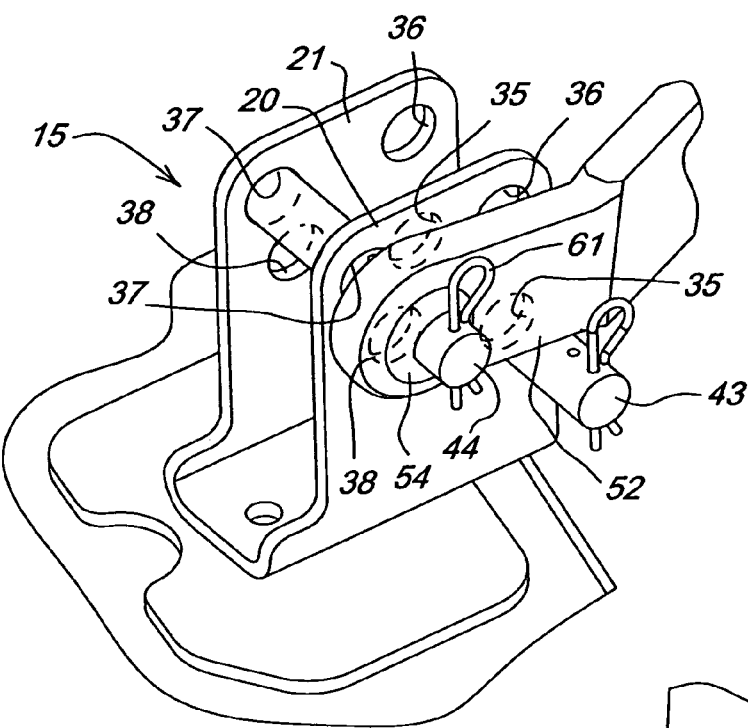
FIG. 3 is a rear perspective view of a transport bracket attached to a three point hitch according to the first embodiment.
Figure 4:
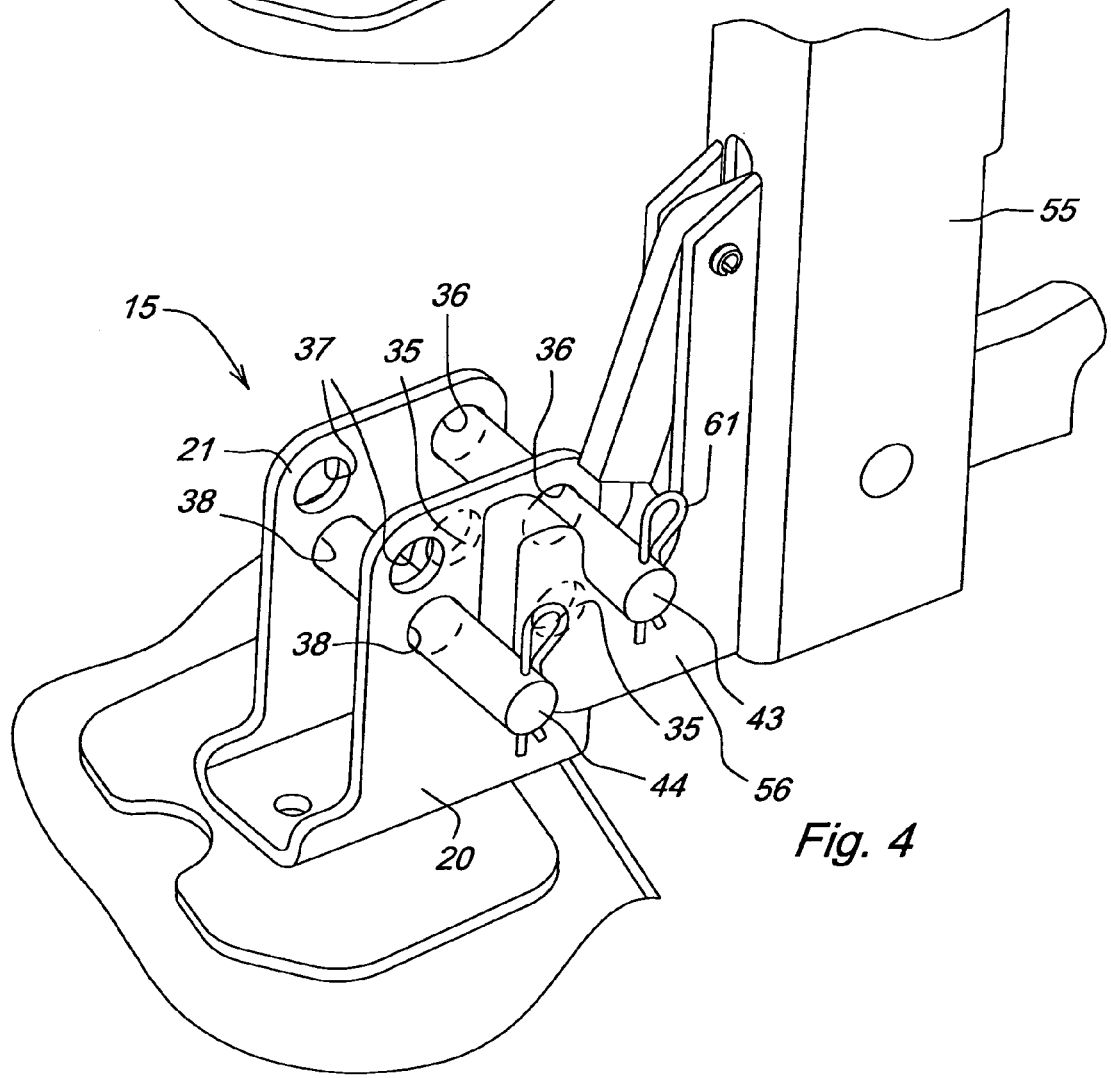
FIG. 4 is a rear perspective view of a transport bracket attached to a quick attach coupler according to a first embodiment of the invention.

Now referring to FIG. 3, both plates 16, 17 may have a plurality of holes transverse to the plate's vertical alignment. For example, each plate 16, 17 may have four holes 31, 32, 33, 34. One or more pins may be inserted through the holes so that each pin may extend between plates 16, 17. For example, front pin 41 may be inserted through either the lower front hole 31 or upper front hole 32 in each of the two plates, and rear pin 42 may be inserted through either the upper rear hole 33 or the lower rear hole 34 in each of the two plates, so that each pin 41, 42 extends between the two plates 16, 17.

Similarly, in one embodiment, right transport bracket 15 may include a pair of vertical plates 20, 21 fastened by welds or other secure attachment to the top surface of the mower deck. Plates 20, 21 may be separated from each other by between about one inch and about five inches, and the brackets together may form a one-piece U-shaped member.

In one embodiment, both plates 20, 21 may have a plurality of holes transverse to the plate's vertical alignment. For example, each plate 20, 21 may have four holes 35, 36, 37, 38. One or more pins may be inserted through the holes so that each pin extends between plates 20, 21. For example, front pin 43 may be inserted through either the lower front hole 35 or upper front hole 36 in each of the two plates, and rear pin 44 may be inserted through either the upper rear hole 37 or lower rear hole 38 in each of the two plates, so that each pin extends between plates 20, 21.

In one embodiment, to lift and carry the mower deck in a generally horizontal position using a three point hitch, front pins 41, 43 may be inserted into the lower front holes 31, 35 in both transport bracket plates, and rear pins 42, 44 may be inserted into the upper rear holes 33, 37. The front and rear pins may maintain the mower deck in a first position within about 10 degrees from horizontal and keep the deck from pivoting. This is because front pins 41, 43 may abut and rest against the bottom of lower lift links 51, 52, while rear pins 42, 44 may fasten to the lower lift links as the pins are inserted through a ball 54 adjacent the ends of each lower lift link of the three point hitch. The present invention allows the mower deck to be lifted and carried in a generally horizontal position by a rear mounted three point hitch, without using the center link of the hitch.

In one embodiment, to lift and carry a mower deck in a generally horizontal position with a quick attach coupler 55 mounted to a three point hitch, as shown in FIG. 2, front pins 41, 43 may be inserted into the top front holes 32, 36, and rear pins 42, 44 may be inserted into the lower rear holes 34, 38. Front pins 41, 43 may be used to secure the deck to the hitch hooks 56, while rear pins 42, 44 may be used to keep the deck from rotating because the pins rest against the backside of the hitch hook 56.

In one embodiment, each of the pins may be secured or locked in position when they are used to lift and carry a mower deck, and also when the mower deck is being used. For example, each pin may have several holes through which a retainer 61 may be inserted to to secure the pins into one or more desired positions. For example, in one embodiment, the pins may be locked in a first position extending toward the outside of the mower deck when the mower deck is being transported. Additionally, the pins may be be locked in a second position extending inwardly toward the inside of the mower deck. Placing the pins in the second position may help prevent the pins from interfering with a drive-over path on the top surface of the mower deck.

In one embodiment, if a three point hitch is used to lift the mower deck, the deck may be moved to a second or service position within about 10 degrees from vertical by removing the front pins. Similarly, if a quick attach coupler is used to lift the mower deck, the deck may be moved to a second or service position within about 10 degrees of vertical by removing the rear pins. Thus, the mower deck may quickly and easily swing from a first position to a second position for servicing.

In an alternative embodiment, a single pin may be used in each of the left and right brackets, instead of a pair of pins in each of the brackets. The mower deck may be lifted by engaging a three point hitch or quick attach coupler to the single pin extending between the plates in each bracket. To keep the mower deck generally horizontal when it is lifted, the top surface of the mower deck may abut and rest against the underside of the three point hitch or quick attach coupler. This may require reinforcing the top surface of the mower deck substantially so that it may engage the underside of the hitch or coupler without deforming or becoming damaged.

Figure 5:
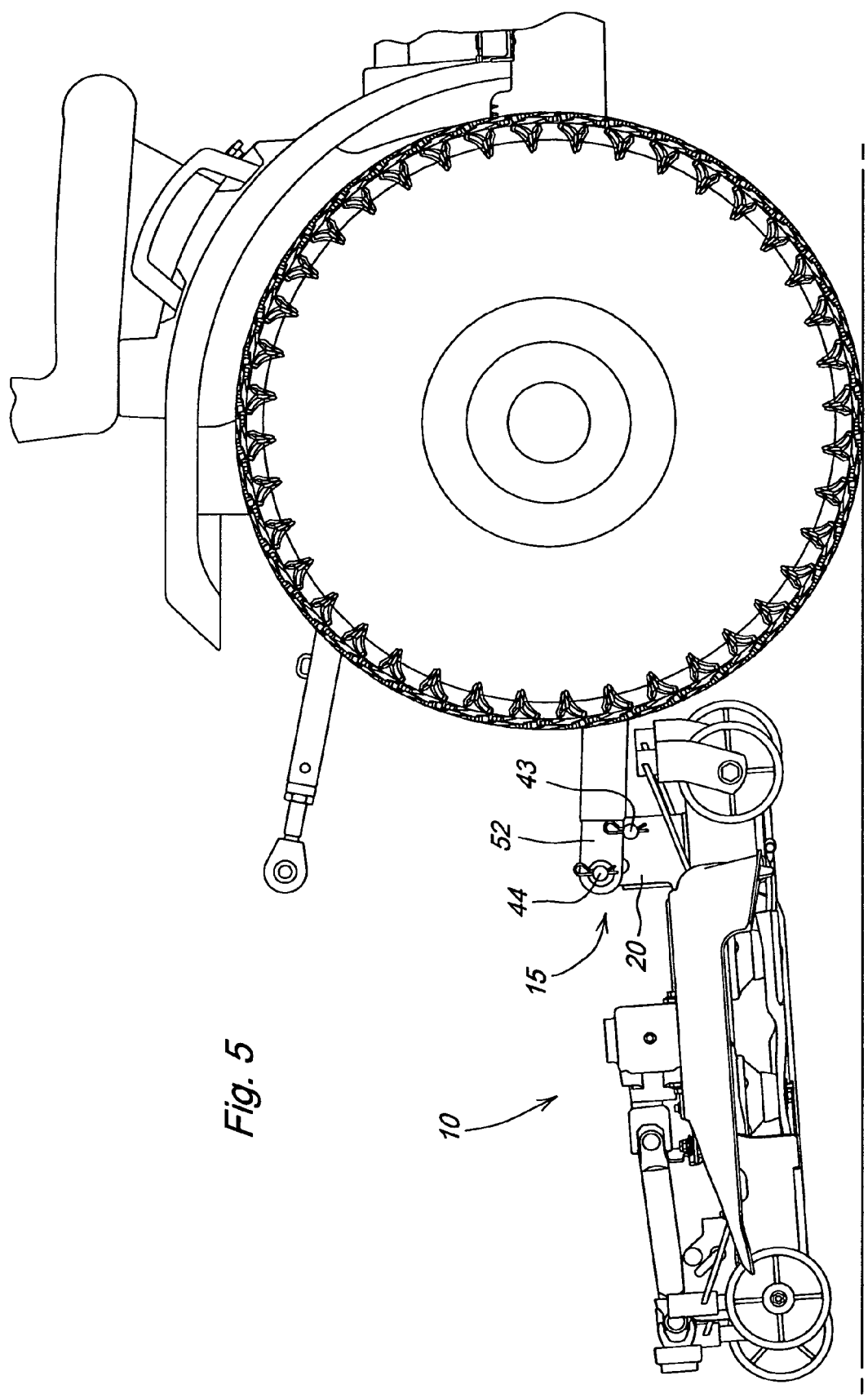
FIG. 5 is a side view of a mower deck with transport brackets carried behind a tractor.

In one embodiment, a method for transporting the mower deck includes the following steps. First, a tractor may be positioned less than about two feet in front of mower deck 10. Pins on the left and right transport brackets may be inserted through the holes that are specified for the three point hitch or other rear-mounted hitch. As stated above, pin placement depends on the type of hitch being used. The pins may may be locked in place with retainers. The hitch hooks then may be lowered sufficiently to engage the top pins on both the left and right transport brakets. As shown in FIG. 5, as the deck is raised off the ground, the lower pins 43 in the transport bracket prevent the deck from pivoting. The raised deck then may be safely transported.

The method and apparatus described may be used to lift a mower deck off the ground surface behind a tractor to a height of several inches up to about four feet. The transport brackets mounted on the top surface of the mower deck allow transporting the deck behind a tractor using a three point hitch or other rear-mounted hitch. Additionally, the transport brackets allow the mower deck to be lifted and tilted so that the underside of the mower deck may be accessed and serviced.

Having described the preferred embodiment, it will become apparent that various modifications can be made without departing from the scope of the invention as defined in the accompanying claims.

The invention claimed is:

1. An apparatus comprising:
   a mower deck having a top surface and covering a plurality of rotary cutting blades;
   a pair of transport brackets on the top surface of the mower deck;
   each transport bracket having two adjacent vertical plates with holes extending transversely through the plates; and
   a pair of pins extending through the holes in two of the adjacent vertical plates, one of the pins securable to a lift link of a rear mounted three point hitch of a tractor to support the mower deck off the ground and the second pin abutting the lift link to maintain the deck in a generally horizontal position when lifted.

2. The apparatus of claim 1 wherein at least one of the pins may be removed so the mower deck may swing from a position of up to about 10 degrees from horizontal to a position about 10 degrees from vertical.

3. The apparatus of claim 1 wherein the rear mounted three point hitch is a rigid hitch.

4. A mower deck transporting apparatus comprising:
   a plurality of vertically oriented plates extending upwardly from a mower deck, each plate having holes extending therethrough; and
   first and second pins received in the holes extending through the plates, the first pins engageable with only a pair of lift links of a tractor hitch to raise the mower deck to a transport position behind the tractor and the second pins abutting the lift links and preventing the mower deck from rotating more than about 10 degrees from horizontal.

5. The mower deck transporting apparatus of claim 4 wherein the plates are positioned adjacent a rim of a mid-mounted mower deck.

6. The mower deck transporting apparatus of claim 4 wherein the pair of lift links are on a three point hitch.

7. The mower deck transporting apparatus of claim 4 wherein the lift links are a quick attach coupler mounted to a three point hitch.

8. The mower deck transporting apparatus of claim 4 further comprising a first pair of plates and a second pair of plates.

9. The mower deck transporting apparatus of claim 4 wherein the first pins are lockable in the holes.

* * * * *